United States Patent
Hata

(10) Patent No.: US 9,088,677 B2
(45) Date of Patent: Jul. 21, 2015

(54) PRINT APPARATUS FOR COMMUNICATING WITH HOST MACHINE AND IMAGE READ APPARATUS VIA COMMUNICATION INTERFACE

(71) Applicant: SEIKO EPSON CORPORATION, Tokyo (JP)

(72) Inventor: Shinji Hata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/225,631

(22) Filed: Mar. 26, 2014

(65) Prior Publication Data

US 2014/0293311 A1    Oct. 2, 2014

(30) Foreign Application Priority Data

Mar. 27, 2013   (JP) ................................. 2013-066995

(51) Int. Cl.
    *G06F 3/12*      (2006.01)
    *H04N 1/00*      (2006.01)

(52) U.S. Cl.
    CPC ....... *H04N 1/00278* (2013.01); *H04N 1/00241* (2013.01); *H04N 2201/0036* (2013.01); *H04N 2201/0081* (2013.01); *H04N 2201/0098* (2013.01)

(58) Field of Classification Search
    USPC .......................................... 710/313; 358/1.13
    See application file for complete search history.

(56) References Cited

U.S. PATENT DOCUMENTS

| 6,473,811 B1* | 10/2002 | Onsen .............................. 710/15 |
| 7,002,702 B1 | 2/2006 | Machida |
| 7,346,729 B2* | 3/2008 | Watanabe ...................... 710/313 |
| 7,609,408 B2* | 10/2009 | Hayashi et al. .............. 358/1.16 |
| 2003/0196011 A1* | 10/2003 | Shih ................................. 710/62 |
| 2004/0227974 A1* | 11/2004 | Hatashita ..................... 358/1.15 |
| 2005/0237559 A1 | 10/2005 | Watanabe |
| 2006/0020729 A1* | 1/2006 | Nakamura et al. ............. 710/113 |
| 2007/0070397 A1* | 3/2007 | Shimoichi ................... 358/1.15 |
| 2008/0239358 A1* | 10/2008 | Uno .............................. 358/1.13 |
| 2009/0189646 A1* | 7/2009 | Cagno et al. .................... 327/77 |
| 2012/0176635 A1* | 7/2012 | Niitsuma ..................... 358/1.13 |

FOREIGN PATENT DOCUMENTS

| JP | 2000-293467 A | 10/2000 |
| JP | 2005-311955 A | 11/2005 |
| JP | 2012-040773 A | 3/2012 |

* cited by examiner

*Primary Examiner* — Benjamin O Dulaney
(74) *Attorney, Agent, or Firm* — Global IP Counselors, LLP

(57) ABSTRACT

A communication connection is established with respect to a computer so as to operate as a single-function printer when a connection with the computer is detected in a state where a communication connection with a scanner is not established, and the communication connection is established with respect to the computer so as to operate as a multi-function printer when the connection with the computer is detected in a state where the communication connection with the scanner is established. When a connection with the scanner is detected in a state where the communication connection is established with respect to the computer as the single-function printer, then in a case where the user gives permission, a temporary restart takes place and the communication connection is reestablished as the multi-function printer, and in a case where the user does not give permission, the communication connection with the computer is maintained without alteration.

1 Claim, 3 Drawing Sheets

PRINT APPARATUS FOR COMMUNICATING WITH HOST MACHINE AND IMAGE READ APPARATUS VIA COMMUNICATION INTERFACE

CROSS-REFERENCE TO RELATED APPLICATIONS

This application claims priority to Japanese Patent Application No. 2013-066995 filed on Mar. 27, 2013. The entire disclosure of Japanese Patent Application No. 2013-066995 is hereby incorporated herein by reference.

BACKGROUND

1. Technical Field

The present invention relates to a print apparatus.

2. Related Art

One conventionally proposed print apparatus of this type is connected to a personal computer as a host machine via a universal serial bus (USB) cable (see JP-A-2012-40773 (patent document 1), for example). In such an apparatus, when a print job is received from the host machine, then a print process is executed in conformity with the content of the received print job.

In another proposed print apparatus, a scanner is directly connected via a transmission cable such as an IEEE 1394-compliant cable or USB cable (see JP-A-2005-311955 (patent document 2), for example). With such an apparatus, image data that has been read with the scanner is inputted via the transmission cable, and the inputted image data is processed to make a print output.

SUMMARY

Now, taking into consideration an instance where a USB connection is established between the host machine and the print machine, which is a device machine, then acquiring a device description that states the configuration as a USB device from the print apparatus enables the host machine to recognize that the print apparatus is a device of a printer class, by the device descriptor. In turn, connecting the scanner as a device machine enables the print apparatus to have expanded functionality, as in patent document 2, but in a case where the scanner is connected to the print apparatus in a state where communication has been established between the host machine and the print apparatus, then making it possible to use the scanner on the host machine side would require that the communication with the host machine be either temporarily blocked and then re-connected or rebooted. In such a case, the host machine side experiences a period where communication with the print apparatus is not possible, and thus there are some instances where convenience is lacking for the user.

An advantage of some aspects of the present invention is to prevent a disconnect of a communication connection not anticipated by the user and successfully improve convenience for the user where a connection between a host machine and an image read apparatus is possible.

A print apparatus according to an aspect of the invention employs the following configuration in order to achieve the advantage described above.

The print apparatus according to the aspect of the invention includes: a host machine-side communicating section configured to communicate with a host machine via a communication interface of a predetermined standard; an image read apparatus-side communicating section configured to communicate with an image read apparatus via a communication interface of a predetermined standard; and a communication connection controlling section configured to establish a communication connection with the host machine so as to operate as a device having a print function with respect to the host machine when a connection with the host machine is detected in a state where a communication connection with the image read apparatus is not established, configured to establish the communication connection with the host machine so as to operate as a device having the print function and an image read function with respect to the host machine when the connection with the host machine is detected in a state where the communication connection with the image read apparatus is established, and configured to maintain the communication connection to the host machine even when a connection with the image read apparatus is detected in a state where the communication connection with the host machine is established as the device having the print function.

With this print apparatus according to the aspect of the present invention, the communication connection with the host machine is established so as to operate as the device having the print function with respect to the host machine when the connection with the host machine is detected in a state where the communication connection with the image read apparatus is not established, and the communication connection with the host machine is established as the device having the print function and the image read function with respect to the host machine when the connection with the host machine is detected in a state where the communication connection with the image read apparatus is established. The communication connection to the host machine is maintained even when the connection with the image read apparatus is detected in a state where the communication connection with the host machine is established as the device having the print function. When the communication connection with the host machine is temporarily disconnected and the communication connection is reestablished, the host machine can no longer communicate with the print apparatus for a certain period of time, and therefore the host machine can no longer utilize the print apparatus. As such, maintaining the communication connection to the host machine without alteration when the connection with the image read apparatus is detected in a state where the communication connection with the host machine is established as the device having the print function makes it possible to prevent the occurrence of a period of time where communication is impossible. As a result, it is possible to prevent the disconnect of the communication connection not anticipated by the user, and successfully improve the convenience for the user.

In the print apparatus according to the aspect of the invention of such description, the communication connection controlling section is further configured to maintain the communication connection to the host machine in a case where the user does not give permission when the connection with the image read apparatus is detected in a state where the communication connection with the host machine is established as the device having the print function, and configured to disconnect the communication connection with the host machine and reestablish the communication connection with the host machine so as to operate as the device having the print function and the image read function with respect to the host machine in a case where the user does give permission. So doing makes it possible to further improve the convenience for the user, because the user of the host machine is able to select between either maintaining the communication connection with the host machine and utilizing without alteration the device having the print function, or reestablishing the communication connection with the host machine and utilizing as a device having a print function and an image read function.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
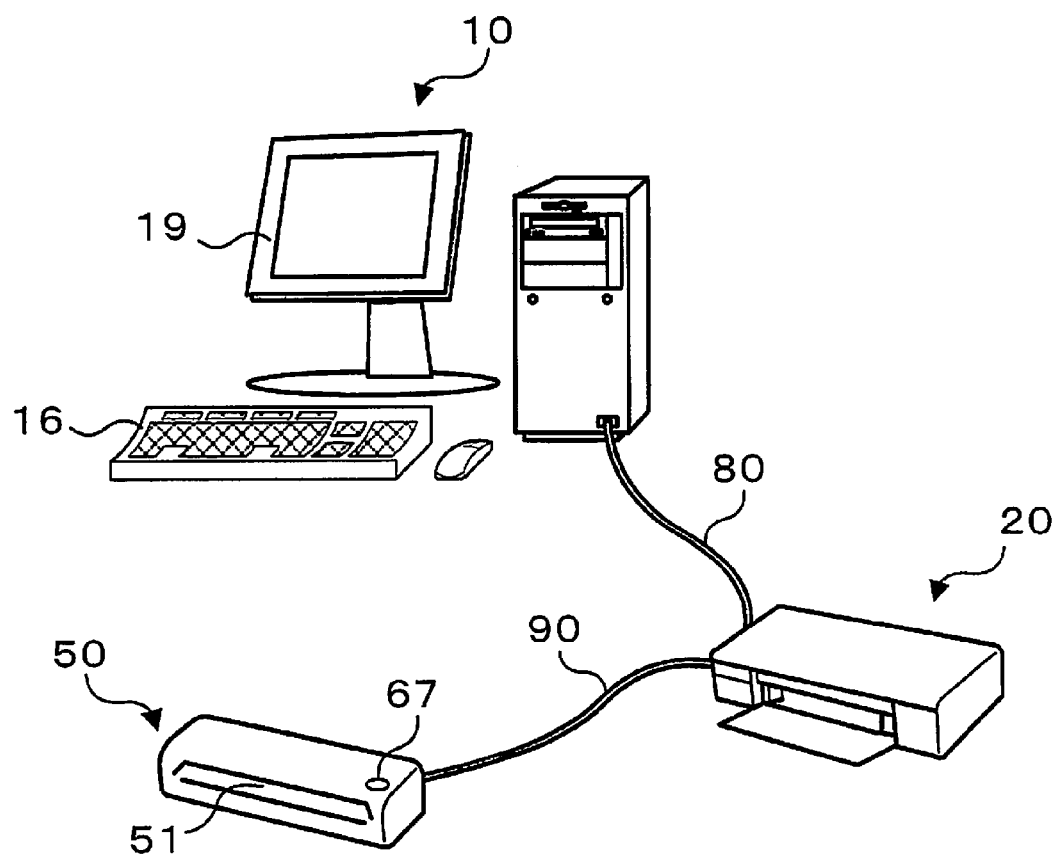
FIG. 1 is a schematic view of a print system of the present embodiment.

An embodiment according to an aspect of the invention shall be described next, with reference to the accompanying drawings. FIG. 1 is a configurational view illustrating a schematic of the configuration of a print system, and FIG. 2 is a block diagram illustrating functional blocks of a computer 10 and printer 20 constituting a print system, as well as a scanner 50.

The print system of the present embodiment is configured as a system with which the computer 10 and the printer 20 can be connected by a USB cable 80, and the printer 20 and the scanner 50 can be connected by a USB cable 90. In the present embodiment, the printer 20 is configured as a portable printer with which driving is carried out by receiving the supply of power coming from an AC adapter (not shown), and driving can also be performed by receiving the supply of power from a battery (not shown). The scanner 50, too, is configured as a scanner with which driving is carried out by receiving the supply of power coming from an AC adapter (not shown), and driving can also be performed by receiving the supply of power from a battery (not shown).

Figure 2:
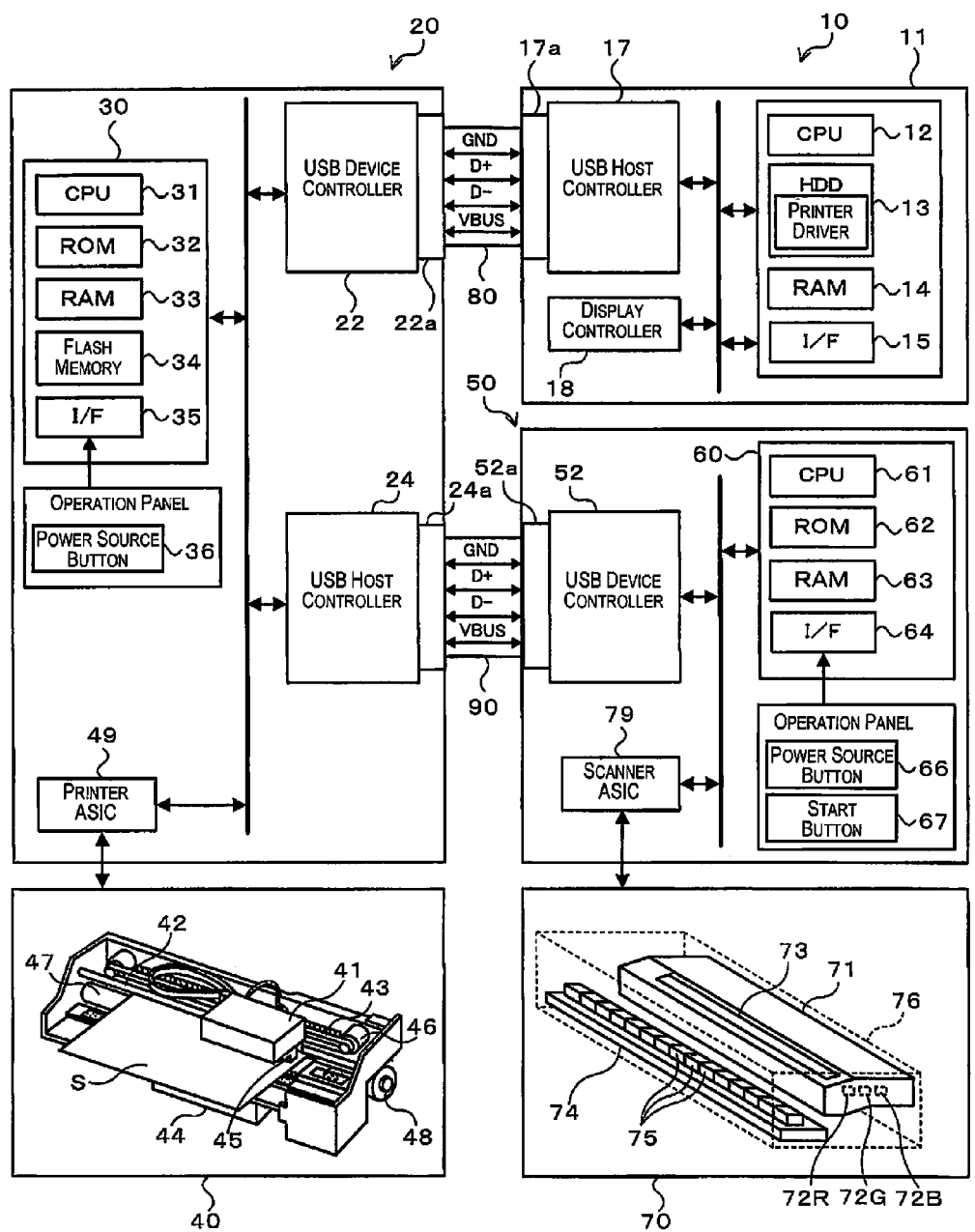
FIG. 2 is a functional block diagram of a computer 10, a printer 20, and a scanner 50.

The computer 10, as illustrated in FIGS. 1 and 2, is configured as a general-purpose computer provided with: a computer main body 11 incorporating a CPU 12 serving as a central computation processing apparatus, a hard disk drive (HDD) 13 storing a variety of applications, user files, printer drivers, and the like, a RAM 14 for temporarily storing data, and the like; a keyboard (and mouse) 16 serving as an input apparatus; and a display 19 serving as a display apparatus. In addition to the CPU 12, the HDD 13, and the RAM 14, the computer main body 11 is provided with: an interface (I/F) 15 for inputting characters from the keyboard 16; a USB host controller 17 complying with the USB 2.0 standard for communicating with a peripheral machine (which, in the present embodiment, is the printer 20) via the USB cable 80, which is connected to a USB port 17a; and a display controller 18 for controlling the display of the display 19; these elements are electrically connected together via a bus.

The printer 20 of the present embodiment is configured as an inkjet printer with a built-in printer engine 40. The printer engine 40, as illustrated in FIG. 2, is provided with: a carriage 41 that is driven by a carriage belt 43 stretched in the shape of a loop in the left/right direction (a main scanning direction) and moves reciprocatingly left and right along a guide 42; ink cartridges 44 for supplying inks of different colors such as cyan, magenta, yellow, and black; a print head 45 for applying pressure to each of the inks supplied from each of the ink cartridges 44 by applying a voltage to and deforming piezoelectric elements, to discharge the inks toward a paper S from nozzles; a carriage motor 46 for driving the carriage belt 43 and reciprocatingly moving the carriage 41 in the main scanning direction; a paper feed roller 47 for conveying the paper S in a direction (a second scanning direction) orthogonal to the direction of movement of the carriage 41; and a paper feed motor 48 for rotatably driving the paper feed roller 47. The present embodiment, however, employs an off-carriage type with which the ink cartridges 44 are not loaded onto the carriage 41, but an on-carriage type with which the ink cartridges are loaded onto the carriage 41 may also be employed.

As a control system therefor, the printer 20 of the present embodiment, as illustrated in FIG. 2, is provided with a main controller 30 for governing over the control of the printer overall, a printer ASIC 49 for governing control over the printer engine 40, a USB device controller 22 for communicating as a device machine to the computer 10, and a USB host controller 24 for communicating as a host machine to the scanner 50. With the printer 20 in the present embodiment, the main controller 30, the printer ASIC 49, the USB device controller 22, and the USB host controller 24 are configured as a system on a chip integrated onto a single chip.

The main controller 30 is configured as a microprocessor for which the center is a CPU 31, and is provided with: a ROM 32 for storing a variety of processing programs, a variety of data, a variety of tables, and the like; a RAM 33 for temporarily storing data; a flash memory 34 which can be written over, and with which data is retained even when the power source is cut; and an interface (I/F) 35 for inputting an operation signal coming from a power source button 36. The main controller 30: receives via the printer ASIC 49, the input of a detection signal coming from a variety of sensors (for example, a carriage position sensor for detecting the position of the carriage 41, a rotational angle sensor for detecting the angle of rotation of the paper feed motor 48, and the like) for detecting the state of driving of the printer engine 40; receives via the USB device controller 22, the input of received data coming from the computer 10; and receives via the USB host controller 24, the input of received data coming from the scanner 50. The main controller 30: outputs, to the USB device controller 22, transmitted data to be transmitted to the computer 10 side; outputs, to the USB host controller 24, transmitted data to be transmitted to the scanner 50 side; and outputs, to the printer ASIC 49, a drive command for the printer engine 40.

The USB device controller 22 and the USB host controller 24, in the present embodiment, are configured as USB controllers compliant with the USB 2.0 standard, and exchange communication data via the USB cables 80, 90, respectively. Herein, the USB cables 80, 90 have a power source system line formed of a VBUS line and a ground (GND) line, and a signal system line formed of a D+ line and a D− line. A standard A plug connected to the USB port 17a on the computer 10 side is provided to one end of the USB cable 80, and a standard B plug connected to the USB port 22a on the printer 20 side is provided to the other end of the USB cable 80. Additionally, a standard A plug connected to the USB port 24a on the printer 20 side is provided to one end of the USB cable 90, and a standard B plug connected to the USB port 52a on the scanner 50 side is provided to the other end of the USB cable 90.

The scanner 50 of the present embodiment is configured as an image scanner of the contact image sensor (CIS) type, with a built-in scanner engine 70. The scanner engine 70, as illustrated in FIG. 2, is provided with a light source unit 71 for irradiating a document with light, a CIS 74 for reading the document by receiving reflected light coming from the document and storing the reflected light as an electrical charge, and an automatic paper feeding apparatus (not shown) for feeding documents inserted to an insertion port 51. The light source unit 71 has light sources that vary relatively little in the amount of light (more specifically, three colors of light sources: a red LED 72R for shining a red light, a green LED 72G for shining a green light, and a blue LED 72B for shining a blue light), and irradiates the document with light coming from the light sources via a light guide 72. The CIS 74 is configured such that there is one line of a plurality of light-receiving elements (CMOS image sensors) 75 arrayed in the main scanning direction, and generates color image data by reading the reflected light one color at a time while sequentially switching between shining the LEDs 72R, 72G, 72B of each of the colors.

The scanner 50 is also provided, as the control system thereof, with a main controller 60 for governing control of the scanner overall, a scanner ASIC 79 for governing control of the scanner engine 70, and a USB device controller 52 for communicating with the printer 20 as a device machine. The scanner ASIC 79, though not depicted, is provided with: an LED drive circuit for driving each of the LEDs 72R, 72G, 72B; an A/D converter for converting an amplified and inputted analog signal produced by the CIS 74 into a digital signal; a drive circuit for driving the automatic paper feed apparatus; and the like; when a scan command coming from the main controller 60 is received in a state where a document has been inserted into the insertion port 51, then the scanner engine 70 is controlled so that the document is read as image data while also being fed.

The main controller 60 is configured as a microprocessor for which a CPU 61 is the center, and is provided with: a ROM 62 for storing a variety of processing programs, a variety of data, a variety of tables, and the like; a RAM 63 for temporarily storing data; and an interface (I/F) 64 for inputting an operation signal coming from a power source button 66 and an operation signal coming from a start button 67. The main controller 60 receives via the scanner ASIC 79 the inputting of a detection signal coming from a variety of sensors for detecting the state of driving of the scanner engine 70, and receives via the USB device controller 52 the inputting of received data coming from the printer 20. The main controller 60 outputs to the USB device controller 52 transmitted data to be transmitted to the printer 20 side, and outputs to the scanner ASIC 79 a drive command for the scanner engine 70.

In the present embodiment, as described above, the scanner 50 is configured as a portable scanner, and in terms of the operation system thereof, is not provided with any operation buttons or operation switches other than the power source button 66 and the start button 67.

The operation of establishing a communication connection between the printer 20 and the scanner 50 shall now be described. When either the power is turned on in a state where the printer 20 and the scanner 50 have been connected by the USB cable 90 or the printer 20 and the scanner 50 are connected by the USB cable 90 in a state where the power has been turned on, a USB communication connection is established, and the USB host controller 24 of the printer 20 acquires a device descriptor that describes the configuration as a USB device from the USB device controller 52 of the scanner 50. This device descriptor includes the fact that the scanner 50 is a device of an image class, and this makes it possible for the printer 20 to recognize that the scanner 50 is a device of the image class. When the communication connection is established and communication with the scanner 50 becomes possible, the printer 20 is able to acquire the image data that is obtained by the scanner 50 by reading the document, and it becomes possible to execute a variety of processes based on the acquired image data. That is to say, the printer 20 of the present embodiment operates as a single-function printer when the communication connection with the scanner 50 is not established, and becomes able to operate as a multi-function printer through collaboration with the scanner 50 when the communication connection with the scanner 50 is established. For example, the printer 20 can execute a copy function for creating print data based on the image data read with the scanner 50 and executing printing, a transfer function for transferring to the computer 10 the image data read with the scanner 50, and the like.

Next, the operation of when the communication connection is established between the printer 20 and the computer 10 shall be described. When either the power is turned on in a state where the printer 20 and the computer 10 have been connected by the USB cable 80 or the printer 20 and the computer 10 are connected by the USB cable 80 in a state where the power has been turned on, a USB communication connection is established, and the USB host controller 17 of the computer 10 acquires a device descriptor that describes the configuration as a USB device from the USB device controller 22 of the printer 20. The printer replies to a request to acquire the device descriptor from the USB host controller 17 with a printer class in a case of operating as a single-function printer, but in a case of operating as a multi-function printer, replies with the printer class as well as with a vendor-specific class indicative of the fact that usage as a scanner is also possible. This makes it possible for the computer 10 to recognize that the printer 20 is a single-function printer when the acquired device descriptor includes only the printer class as the device class, and to recognize that the printer 20 is a multi-function printer when the acquired device descriptor includes the printer class and the vendor-specific class as the device class. When the communication connection is established and communication with the printer 20 becomes possible, then the computer 10 becomes able either to transmit a print command (print job) to the printer 20 and cause an image to be printed, or, in a case where the printer 20 is operating as a multi-function printer, to cause a variety of functions to be executed.

Figure 3:
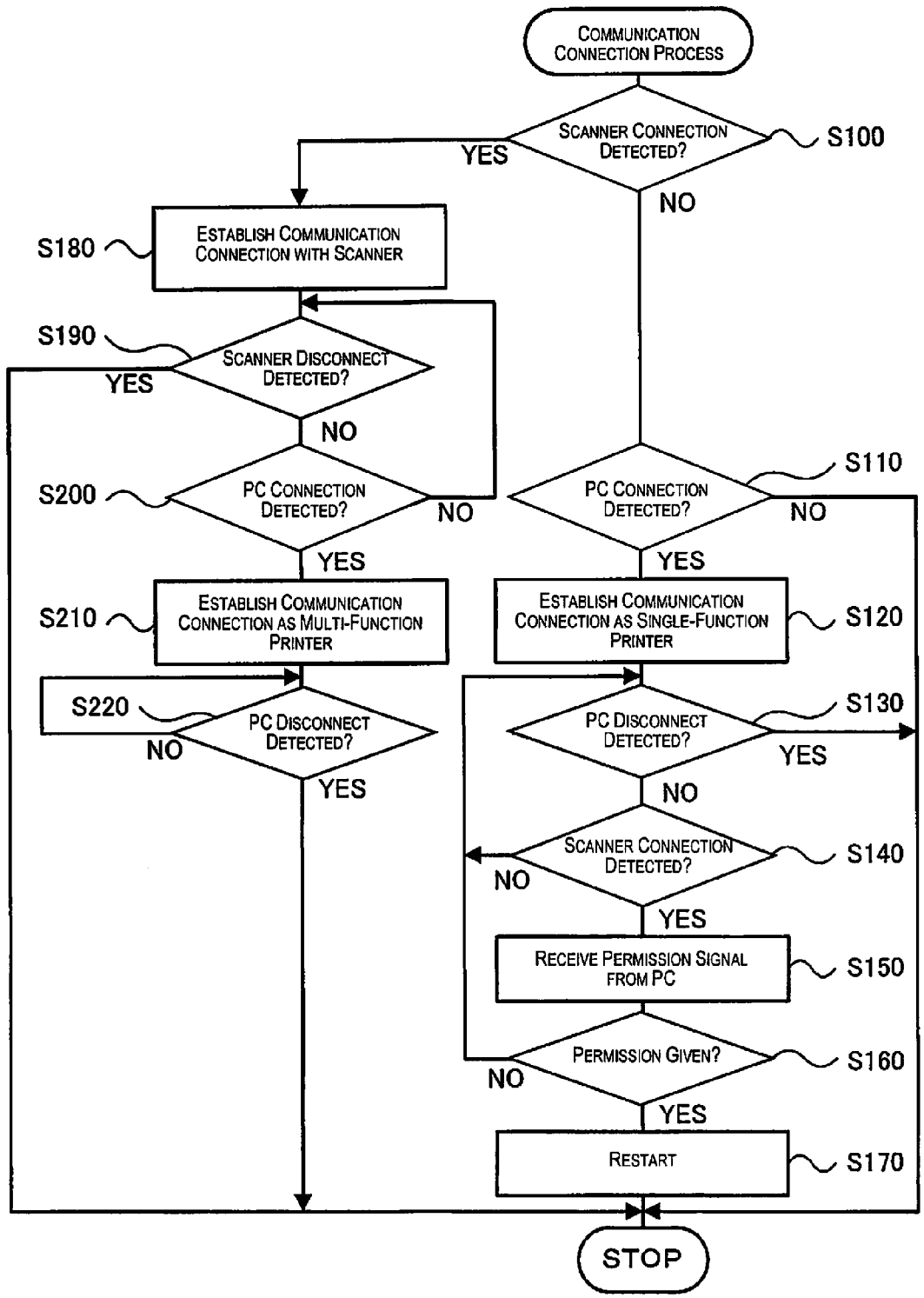
FIG. 3 is a flow chart illustrating one example of a communication connection process.

The operation of the printer 20 of the present embodiment thus configured and, in particular the operation of during the communication connection between the computer 10 and the scanner 50 shall be described next. FIG. 3 is a flow chart illustrating one example of a communication connection process executed by the CPU 31 of the main controller 30.

When the communication connection process is executed, the CPU 31 of the main controller 30 first determines whether or not a connection with the scanner 50 has been established (step S100). The process of step S100 could be performed by inputting a detection signal from the USB host controller 24 when the USB host controller 24 has detected that either the power was turned on in a state where the printer 20 and the scanner 50 were connected by the USB cable 90, or the printer 20 and the scanner 50 were connected by the USB cable 90 in a state where the power had been turned on. When a connection with the scanner 50 is determined not to have been detected, then next there is a determination as to whether or not a connection with the computer 10 has been detected (step S110). The process of step S110 could be performed by inputting a detection signal from the USB device controller 22 when the USB device controller 22 has detected that either the power was turned on in a state where the printer 20 and the computer 10 were connected by the USB cable 80, or the printer 20 and the computer 10 were connected by the USB cable 80 in a state where the power had been turned on.

When a connection with the computer 10 is detected in a state where a connection with the scanner 50 has not been detected, then a communication connection is established with the computer 10 so as to operate as the previously described single-function printer (step S120). Next, a determination is made as to whether or not a disconnect from the computer 10 has been detected (step S130) and whether or not a connection with the scanner 50 has been detected (step S140), respectively. The communication connection process is concluded when a disconnect from the computer 10 is determined to have been detected. In turn, when a connection with the scanner 50 is determined to have been detected in a state where a disconnect from the computer 10 was not detected, then either a permission signal for permitting a restart or a rejection signal for rejecting a restart is acquired from the computer 10 (step S150). This process, for example, could be performed on the computer 10 side by displaying on the display 19 a message such as, for example, "Scanner has been connected. Printer needs to be restarted in order to activate. Permission granted?" as well as selection buttons for "Yes" and "No" and accepting a selection from the user, where clicking the button for "Yes" prompts the permission signal to be transmitted from the USB host controller 17 and clicking the button for "No" prompts the rejection signal to be transmitted from the USB host controller 17, and, on the printer 20 side, by receiving the signal transmitted from the computer 10 via the USB device controller 22. When a permission signal is determined to be received from the computer 10 (YES for step S160), then a restart is performed (step S170) and the communication connection process is concluded. Herein, when the communication connection process is executed after the printer 20 has been restarted, the process for steps S180 onward would be executed, because the connection with the scanner 50 is determined to have been detected in step S100. The process for steps S180 shall be described below.

When the rejection signal is received from the computer 10 (NO for step S160), however, then the communication connection with the computer 10 is maintained without alteration and without restarting; the flow returns to step S130, and the process for steps S130 to 160 is repeated until a disconnect from the computer 10 is detected. The reason for so doing shall be described below.

When a connection with the scanner 50 is determined to have been detected in step S100, then a communication connection with the scanner 50 is established (step S180). Next, a determination is made as to whether or not a disconnect from the scanner 50 has been detected (step S190) and whether or not a connection with the computer 10 has been detected (step S200), respectively. The communication connection process is concluded when a disconnect from the scanner 50 is determined to have been detected. When a connection with the computer 10 is determined to have been detected in a state where a disconnect from the scanner 50 has not been detected, then the communication connection is established with respect to the computer 10 so as to operate as the previously described multi-function printer (step S210). As described previously, when the restart is permitted by the user in a case where a communication connection is established with the computer 10 and a connection with the scanner 50 is detected in a state where the printer is operating as the single-function printer, then the printer 20 restarts, and when the communication connection process is next executed, a communication connection with the computer 10 is re-established by the steps S180 to S210. This makes it possible for the printer 20 to operate as the multi-function printer with respect to the computer 10. However, because restarting the printer 20 requires a certain length of time, the computer 10 experiences a length of time where communication with the printer 20 is not possible. When the communication connection with the computer 10 is established, a determination is made as to whether or not a disconnect from the computer 10 has been detected (step S220), and the communication connection process is concluded when a disconnect from the computer 10 is determined to have been detected.

Herein, as described previously, restarting the printer 20 requires a certain length of time, during which time the computer 10 is unable to communicate with the printer 20, which in some instances adversely affects the convenience for the user. Therefore, the shortcoming is prevented from taking place by restarting the printer 20 and performing a re-connect with the computer 10 only in a case where the user gives permission in the steps S150 to S170.

The relationships of correspondence between the constituent elements of the present embodiment and the constituent elements of the present invention shall now be made readily apparent. In the present embodiment, the computer 10, the USB device controller 22, the scanner 50, the USB host controller 24, and the CPU 31 of the main controller 30 for executing the communication connection process of FIG. 3 correspond to the "host machine", the "host machine-side communicating section or means" of the present invention, the "image reading apparatus", the "image read apparatus-side communicating section or means", and the "communication connection controlling section or means", respectively.

According to the printer 20 of the present embodiment described above, the communication connection is established with respect to the computer 10 so as to operate as the single-function printer when a connection with the computer 10 is detected in a state where a communication connection with the scanner 50 has not been established, and the communication connection is established with respect to the computer 10 so as to operate as the multi-function printer when a connection with the computer 10 is detected in a state where a communication connection with the scanner 50 has been established. It is also possible to prevent a disconnect of the communication connection that is not anticipated by the user and to improve the convenience for the user, because the communication connection with the computer 10 is maintained even when the connection with the scanner 50 is detected in a state where the communication connection has been established with respect to the computer 10 as the single-function printer.

Further, according to the printer 20 of the present embodiment, collaboration with the scanner 50 enables the user to utilize a variety of functions, such as the copy function and the transfer function, because a restart and a reconnection to the computer 10 as the multi-function printer takes place in a case where the user gives permission for a restart when the connection with the scanner 50 is detected in a state where the communication connection has been established with respect to the computer 10 as the single-function printer.

The present invention is in no way limited to the embodiment described above, and it shall be readily understood that the present invention can be implemented in a variety of modes provided that the implementation falls within the technical scope of the present invention.

For example, the embodiment described above is such that when the connection with the scanner 50 is detected in a state where the communication connection has been established with respect to the computer 10 as the single-function printer, then once a restart takes place, the communication connection is established so as to operate as the multi-function printer with respect to the computer 10; however, the configuration may be such that there is no restart, and the communication connection with the computer 10 is temporarily shut off, and the communication connection with the computer 10 is re-established. In such a case, too, the significance of applying the present invention is still high, because there is a length of time where communication with the computer 10 is no longer possible.

The embodiment described above is such that the printer 20 is applied to a portable printer, but there is no limitation thereto, and the configuration may be for application to a stationary printer. The scanner 50, too, is not limited to being applied to a portable scanner, and may be applied to a stationary scanner.

The embodiment described above is such that USB is used as a communication standard for communicating with the computer 10 (a host machine) and the scanner 50 (a device machine), but there is no limitation thereto, and any communication standard may be used.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A print apparatus comprising:
   a host machine-side communicating section configured to communicate with a host machine via a communication interface of a predetermined standard;
   an image read apparatus-side communicating section configured to communicate with an image read apparatus via a communication interface of a predetermined standard; and
   a communication connection controlling section configured to establish a communication connection with the host machine so as to operate as a device having a print function with respect to the host machine when a connection with the host machine is detected in a state where a communication connection with the image read apparatus is not established, configured to establish the communication connection with the host machine so as to operate as a device having the print function and an image ready function with respect to the host machine when the connection with the host machine is detected in a state where the communication connection with the image read apparatus is established, and configured to maintain the communication connection to the host machine even when a connection with the image read apparatus is detected in a state where the communication connection with the host machine is established as the device having the print function,
   the communication connection controlling section being further configured to maintain the communication connection to the host machine in a case where a user does not give permission when the connection with the image read apparatus is detected in a state where the communication connection with the host machine is established as the device having the print function, and configured to disconnect the communication connection with the host machine and reestablish the communication connection with the host machine so as to operate as the device having the print function and the image read function with respect to the host machine in a case where the user does give permission.

\* \* \* \* \*